(12) United States Patent
Ji

(10) Patent No.: US 7,122,121 B1
(45) Date of Patent: Oct. 17, 2006

(54) ADVANCED SUBMERGED MEMBRANE MODULES, SYSTEMS AND PROCESSES

(76) Inventor: Jiang Ji, 4 Hawk Dr., Salem, NH (US) 03079

( * ) Notice: Subject to any disclaimer, the term of this patent is extended or adjusted under 35 U.S.C. 154(b) by 392 days.

(21) Appl. No.: 10/857,531

(22) Filed: May 28, 2004

(51) Int. Cl.
- B01D 63/16 (2006.01)
- B01D 63/04 (2006.01)
- B01D 63/06 (2006.01)
- B01D 63/08 (2006.01)
- B01D 65/02 (2006.01)
- B01D 65/08 (2006.01)
- B01D 63/00 (2006.01)
- C02F 1/00 (2006.01)

(52) U.S. Cl. .................. 210/321.67; 210/321.68; 210/321.69; 210/636; 210/650; 210/500.23; 210/321.75; 210/323.2; 210/321.8; 210/321.84; 210/321.89

(58) Field of Classification Search .......... 210/321.67, 210/321.68, 321.69, 325, 329, 324
See application file for complete search history.

(56) References Cited

U.S. PATENT DOCUMENTS

| | | | |
|---|---|---|---|
| 4,540,490 A * | 9/1985 | Shibata et al. ............ | 210/323.2 |
| 4,952,317 A * | 8/1990 | Culkin ....................... | 210/636 |
| 5,192,456 A | 3/1993 | Ishida et al. | |
| 5,482,625 A | 1/1996 | Shimizu et al. | |
| 5,944,997 A | 8/1999 | Pedersen | |
| 6,319,411 B1 * | 11/2001 | Cote ........................... | 210/636 |
| 6,354,444 B1 | 3/2002 | Mahendran | |
| 6,708,957 B1 | 3/2004 | Cote et al. | |
| 2001/0027951 A1* | 10/2001 | Gungerich et al. ......... | 210/636 |
| 2002/0139748 A1* | 10/2002 | Cote et al. .................. | 210/636 |
| 2004/0188339 A1* | 9/2004 | Murkute et al. .......... | 210/321.8 |

OTHER PUBLICATIONS

U.S. Appl. No. 10/620,715, filed Jul. 16, 2003, J. Ji.
U.S. Appl. No. 10/604,664, filed Aug. 8, 2003, J. Ji.

* cited by examiner

Primary Examiner—Krishnan S. Menon
(74) Attorney, Agent, or Firm—Jiang Ji (57) ABSTRACT

Advanced submerged membrane systems are provided. Said submerged membrane systems have multiple membrane modules comprising of strips of flat sheet membrane, bundles of self-support hollow fiber membranes braided together for reinforcement, tubular membranes, and braid supported hollow fiber membranes. Said submerged membrane systems have alternating relay, or two-way floating switch or computer to control filtration and back flush/pulse cleaning. Said submerged membrane systems have an oscillating motor, and aerator which can generate liquid vortex (whirlpool) flow around membrane to keep membrane from fouling. The present invention provides advanced submerge membrane systems at very low cost for drinking water production, wastewater treatment and membrane bioreactors for biotech, pharmaceutical and other industries.

13 Claims, 12 Drawing Sheets

ADVANCED SUBMERGED MEMBRANE MODULES, SYSTEMS AND PROCESSES

CROSS-REFFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to the field of submerged membrane modules, systems and processes, which are useful for liquid separation, bioreactor, and water purification.

In a submerged membrane system, membrane modules are submerged in water, water flow from outside to inside the membrane under vacuum suction to be filtered. Compared to the conventional inside-out membrane filtration, submerged membrane filtration has lower transmembrane pressure, less energy consumption. Submerged membrane system can filter a feed solution containing much higher solid concentration than the conventional inside-out membrane system.

Membrane fouling is a major issue in submerged membrane systems. A great effort has been made to prevent membrane form fouling. These efforts include improving membrane hydrophilicity, cleanability, aeration, back pulse and back flush cleaning.

U.S. Pat. No. 5,944,997 describes a submerged membrane system having aerator located underneath the membrane module. Though this type of aerator can provide aeration, the holes of the aerator are often found to be blocked by the accumulation of suspended solid particles in feed solution. U.S. Pat. No. 6,708,957 attempts to address this issue by suspending the aerator on a pivot point, the aerator moves through an arc of pendulum, in an alternative design, the aerator rotates in a generally horizontal plane about generally vertical axis. Although this type of aerator can prevent air hole from plugging, it does not create sufficient aeration and liquid vortex flow, which will reduce membrane fouling.

U.S. Pat. No. 5,192,456 describes aeration system using mechanical agitating device under the plate frame membrane module to agitate suspended solid and disperse aeration bubbles, but it does not generate liquid vortex flow around membranes, because its rectangular geometry and the agitator is far away from the membrane module.

In order to remove a certain harmful waste in biological wastewater treatment process, aeration has to be temporarily stopped because some microorganism which convert harmful materials to harmless materials dislike oxygen. In this time period, membrane is easy to foul due to lack of aeration. The submerged membrane systems in the prior art are insufficient to deal with this situation.

In a commercial submerged membrane system, back flash and back pulse are often used to clean membrane. The control system for back flash and back pulse are very sophisticated, it often makes membrane system too expensive to use, compared to conventional water treatment method.

Membrane life time is another major issue. Violent aeration can dramatically reduce membrane life time. U.S. Pat. No. 6,354,444, describes braid reinforced hollow fiber membranes, which is stronger than self-support hollow fiber membrane, but it is much more expensive than the self-support hollow fiber membrane. There is need to make self-support hollow fiber more durable than its original form.

The present invention is aimed to address these issues alluded to in the previous paragraphs.

SUMMARY OF THE INVENTION

It is an object of the present invention to provide an effective submerged membrane system at low cost.

It is another object of the present invention to provide efficient membrane modules for submerged membrane system at low cost.

It is another object of the present invention to provide vortex flow by aeration to prevent membrane from fouling.

It is another object of the present invention to provide whirlpool flow without aeration to prevent membrane from fouling.

It is another object of the present invention to provide an effective control for filtration and cleaning at low cost.

It is another object of the present invention to provide an efficient process for operating submerged membrane system at low cost.

BRIEF DESCRIPTION OF THE DRAWINGS

The present invention can be illustrated with the assistance of the following drawings.

DETAILED DESCRIPTION OF THE INVENTION

The present invention has a number of features, which are more advanced than the prior art. These advances are described in details in this section and defined in the appended claims.

Figure 1:
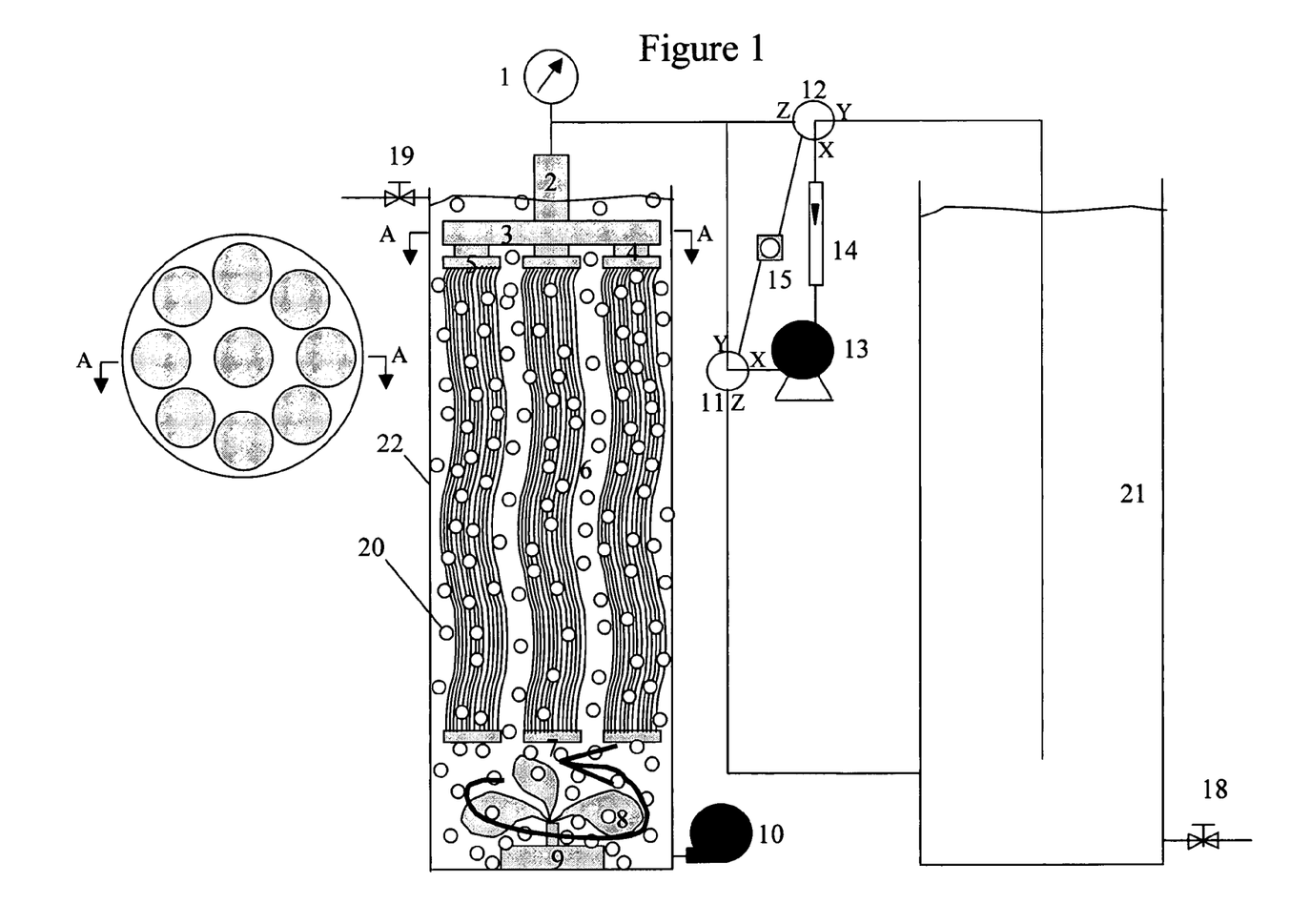
FIG. 1 is the submerged membrane system having a single pump, an alternating relay and two 3-way valves of the present invention.

According to the present invention, a novel submerged membrane system is provided. It has a cluster of disposable membrane modules, 6, installed into disk header, 3, via swagelok connection, 4, as shown in FIG. 1. The membrane assembly is submerged in a cylindrical water tank, 22, there is a sprinkler type aerator, 9, at the bottom of the tank to provide aeration for cleaning the membrane. When compressed air is forced through the air holes circularly arranged at the edge of the aerator base, it propels the propeller, 8, to generate liquid vortex flow around the membrane to keep the membrane clean. The system has one pump, 13, to provide both suction and back flush. An alternating relay, 15, controls three-way valves 11, and 12 to direct liquid flow. In filtration mode, the relay keeps the three-way valves at X-Y connection, the liquid is sucked from outside to inside the membrane to be filtered and pumped into a storage tank, 21, the flow rate of the filtered liquid is measured by flow meter, 14. In back flush or back pulse mode, the relay switches the three-way valve to X-Z connection, the purified liquid is pumped from the storage tank into the inside of the membrane to flush any deposit out of membrane surface. The ratio of filtration time to back flush/pulse time can be easily controlled in a very broad range by setting the clock of the alternating relay. The membrane system and process illustrated in FIG. 1 is are very efficient and much simpler than those described in the prior art. It is a single pump system can do both permeate suction and back flush/pulse without reversing pump rotation. It should be point it out that a reversible pump is extremely expensive compared to mono directional pump. The three-way valves can be eliminated if the mono directional pump is replaced by a reversible pump, in this case, the alternating relay controls the ratio of filtration time to back flush/pulse time.

Figure 2:
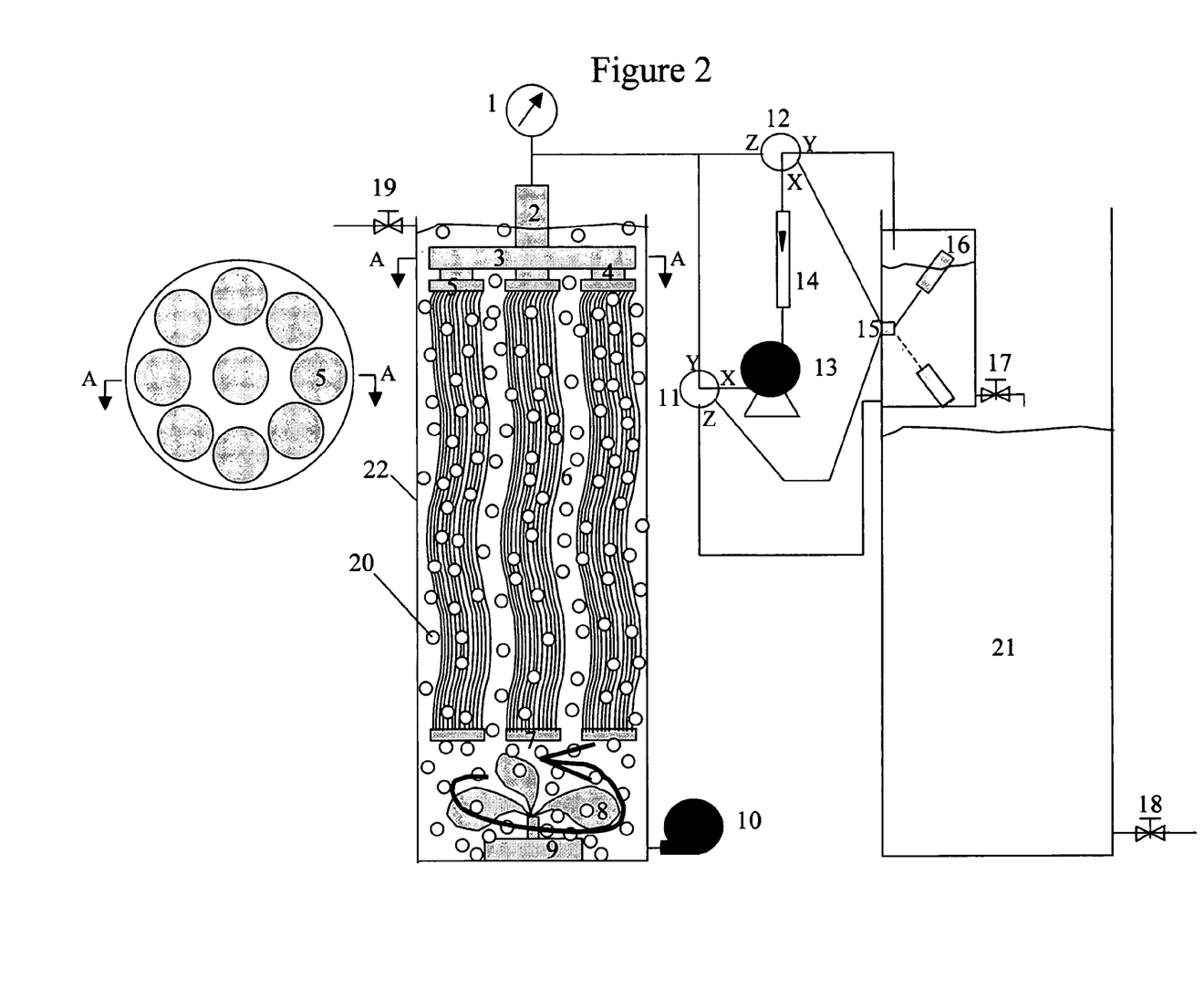
FIG. 2 is the submerged membrane system having a single pump, a 2-way floating switch and two 3-way valves of the present invention.

A similar system and process is described in FIG. 2, where the alternating relay is replaced with a two-way floating switch. When the floating switch is at down position, it switches the three-way valve to X-Y connection to do filtration. When the floating switch is at up position, it switches the three-way valve to X-Z connection to do back flush/pulse cleaning. The ratio of filtration time to back flush/pulse cleaning time is controlled by the ratio of permeate flow rate through the pump to the flow rate through the valve, 17.

Figure 3:
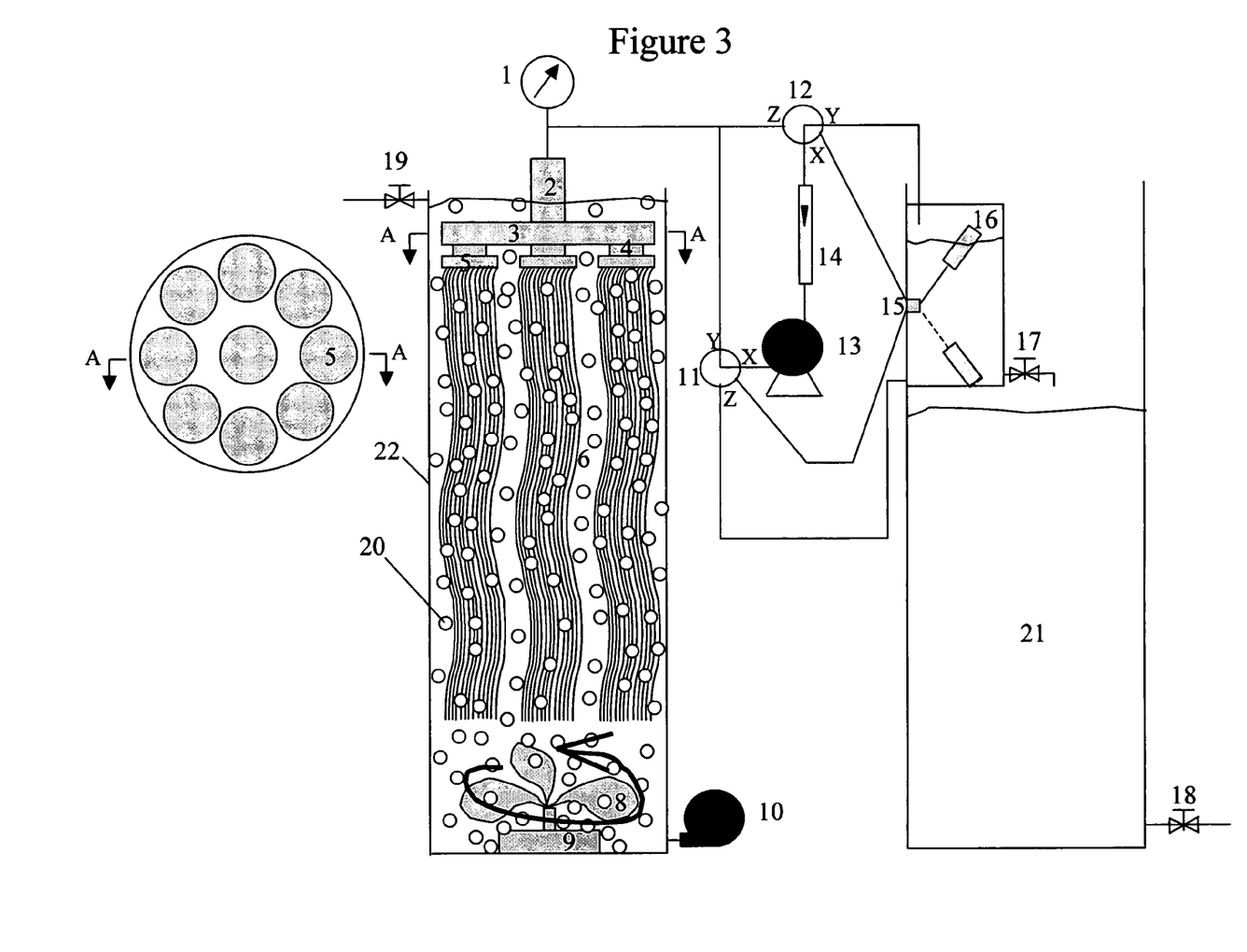
FIG. 3 is the submerged membrane system having a single pump, a 2-way floating switch and two 3-way valves of the present invention, wherein the membrane modules do not have a bottom header.

Almost an identical system is described in FIG. 3. Only difference between the membrane systems in FIGS. 2 and 3 is that the membrane modules in FIG. 3 do not have bottom header, it is beneficial in some circumstances to generate free movement of membrane to reduce fouling.

Figure 4:
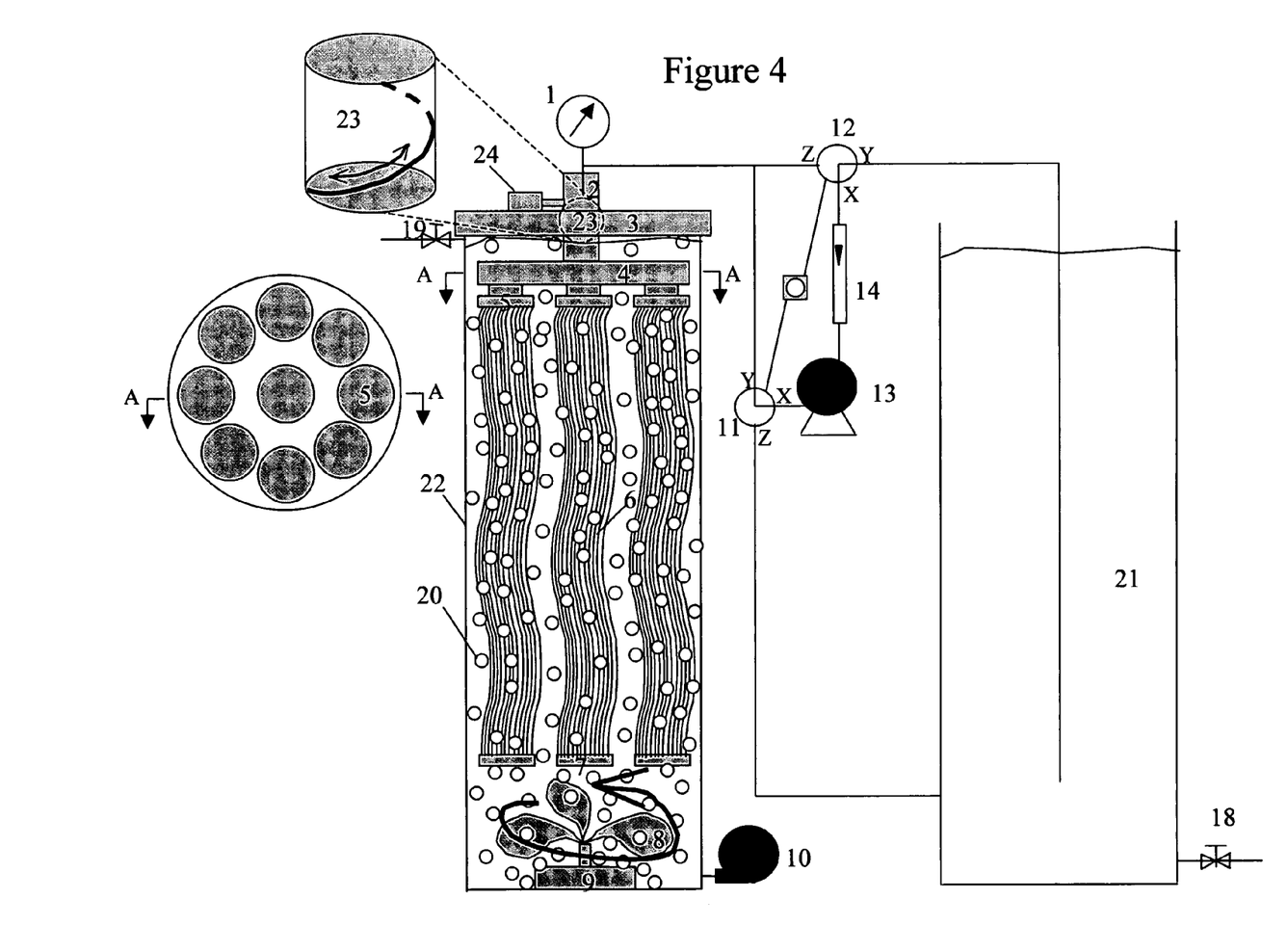
FIG. 4 is the submerged membrane system having a single pump, an alternating relay, two 3-way valves and an oscillating motor of the present invention, the system is operated at the presence of aeration.
Figure 5:
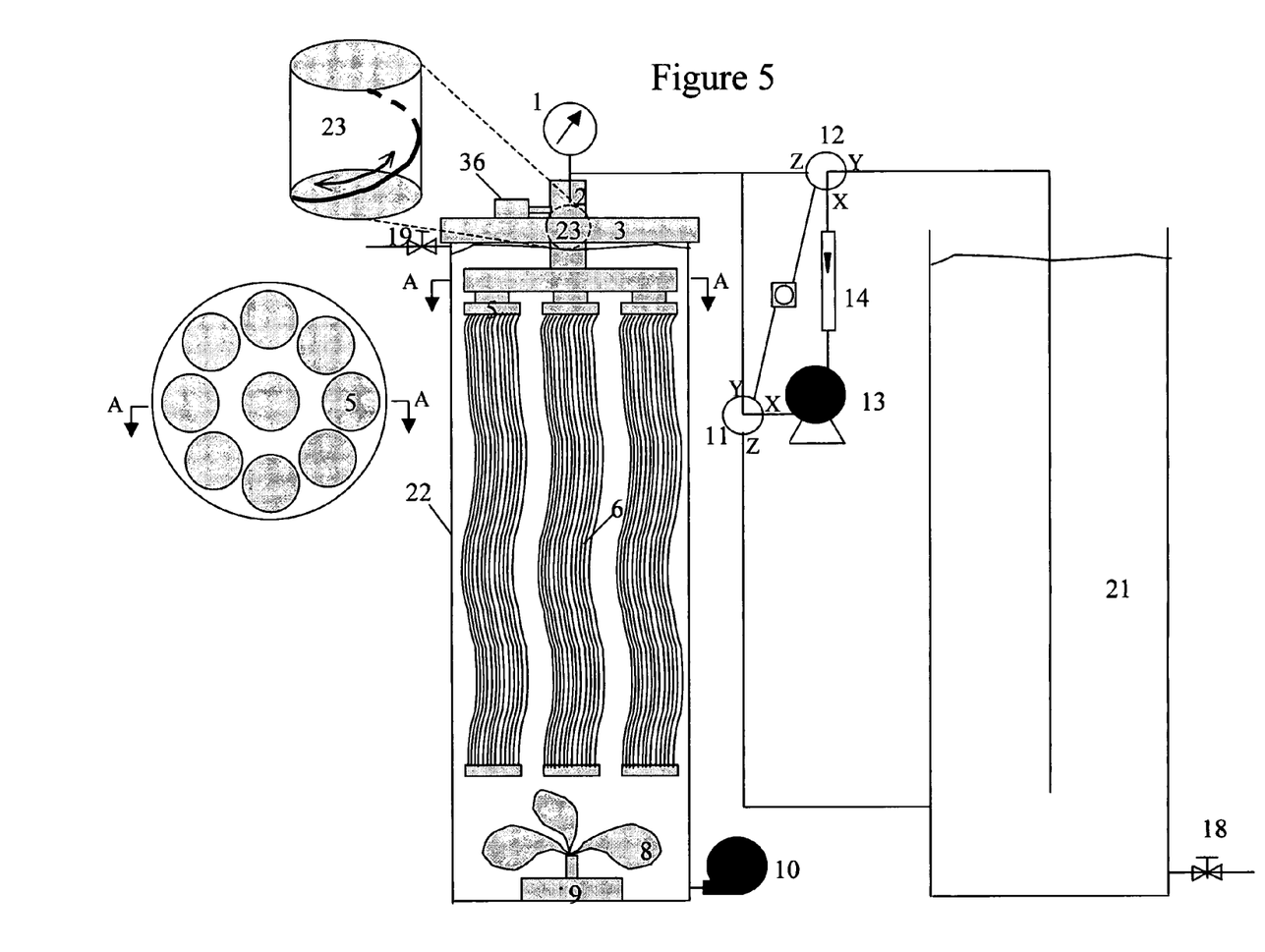
FIG. 5 is the submerged membrane system having a single pump, an alternating relay, two 3-way valves and an oscillating motor of the present invention, the system is operated at the absence of aeration.

In order to remove a certain harmful waste in biological wastewater treatment process, aeration has to be temporarily stopped because some microorganism which convert harmful materials to harmless dislike oxygen. In this time period, membrane is easy to foul because there is no aeration. The submerged membrane systems in the prior art are insufficient to deal with this situation. Therefore, a new membrane system shown in FIG. 4, is invented in this invention to prevent membrane from fouling during absence of aeration by generating liquid whirlpool flow around the membrane. A motor, 36, is attached to a gear, 23, connected to the center permeate tube, 2. The motor is controlled to rotate 360 degree periodically back and forth. For each cycle, the membrane not only rotate 360 degree twice but also move up and down vertically to generate three dimensional movement to keep membrane clean. The operation under no aeration mode is shown in FIG. 5.

Figure 6:
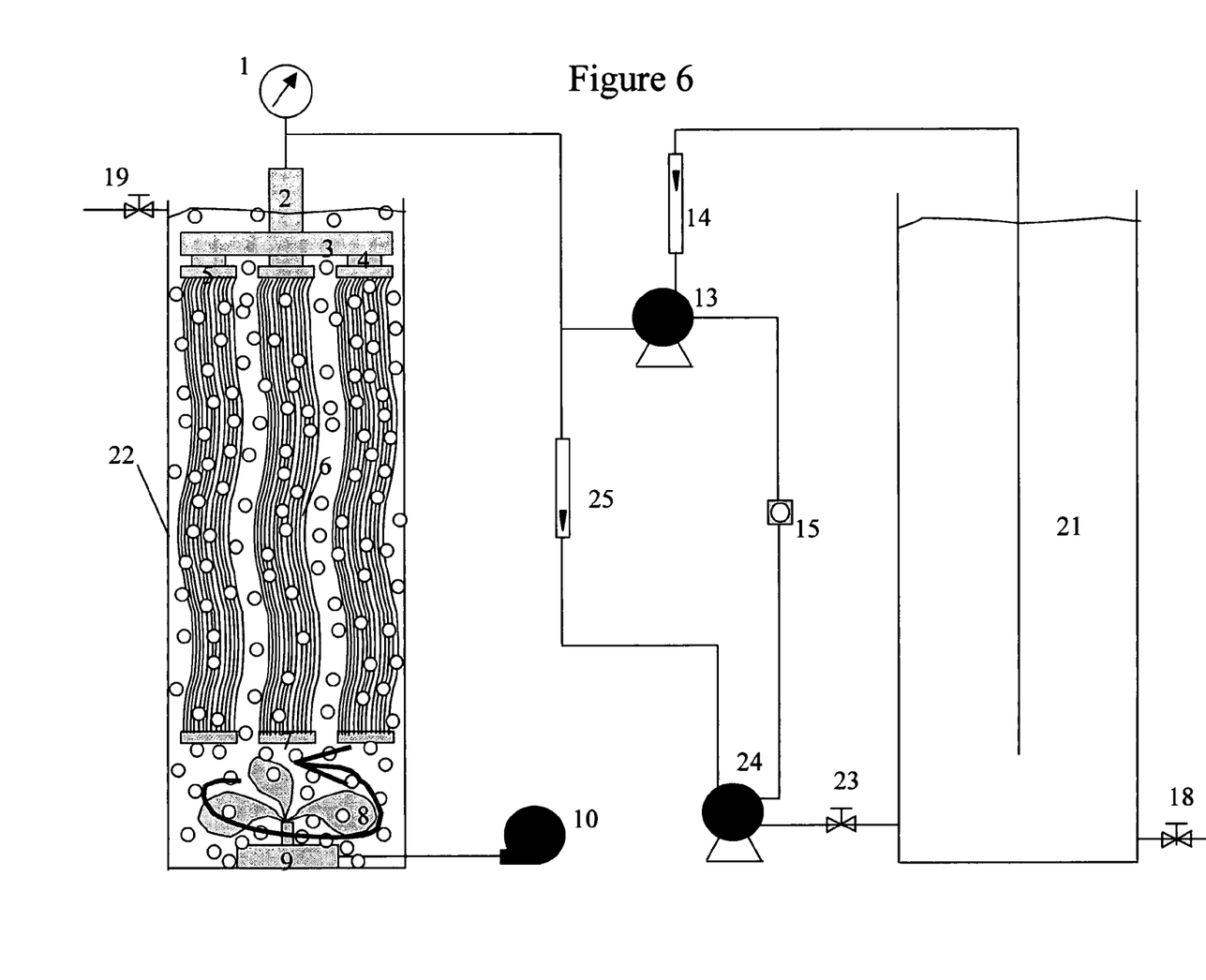
FIG. 6 is the submerged membrane system having two pumps and an alternating relay to control filtration and back flush/pulse cleaning of the present invention.
Figure 7:
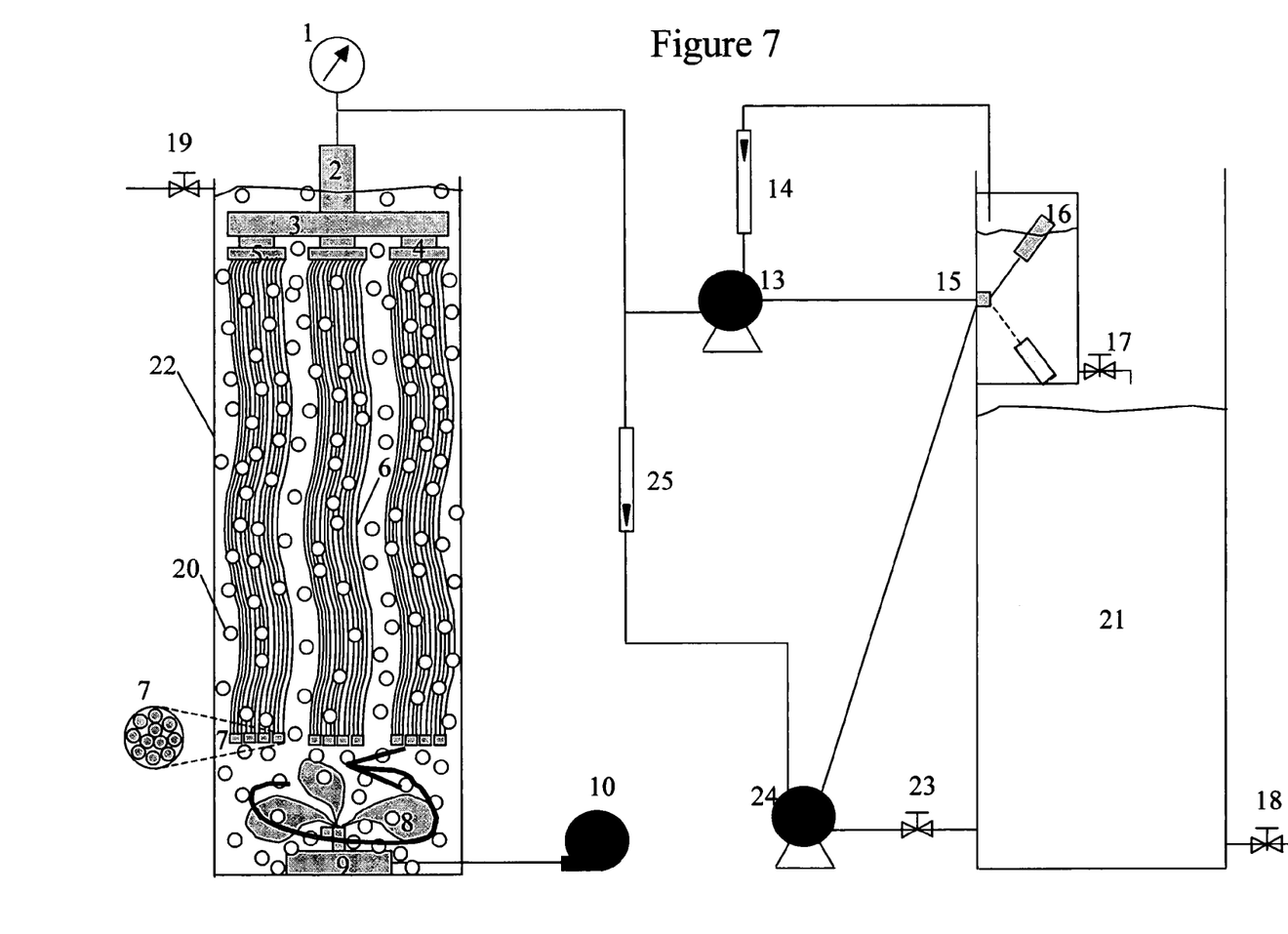
FIG. 7 is the submerged membrane system having two pumps and a 2-way floating switch to control filtration and back flush/pulse cleaning of the present invention.

A membrane system having two pumps is shown in FIG. 6. One pump, 13, is for filtration, another pump, 24, for back flush/pulse cleaning. The operation time ratio between two pumps is controlled by an alternating relay, 15. The two pumps are identical, the function of two pumps are interchangeable, the life time of the pumps can be extended by routinely exchange their position. A similar system is shown in FIG. 7, where the alternating relay is replaced with a two-way floating switch, 16.

Figure 8:
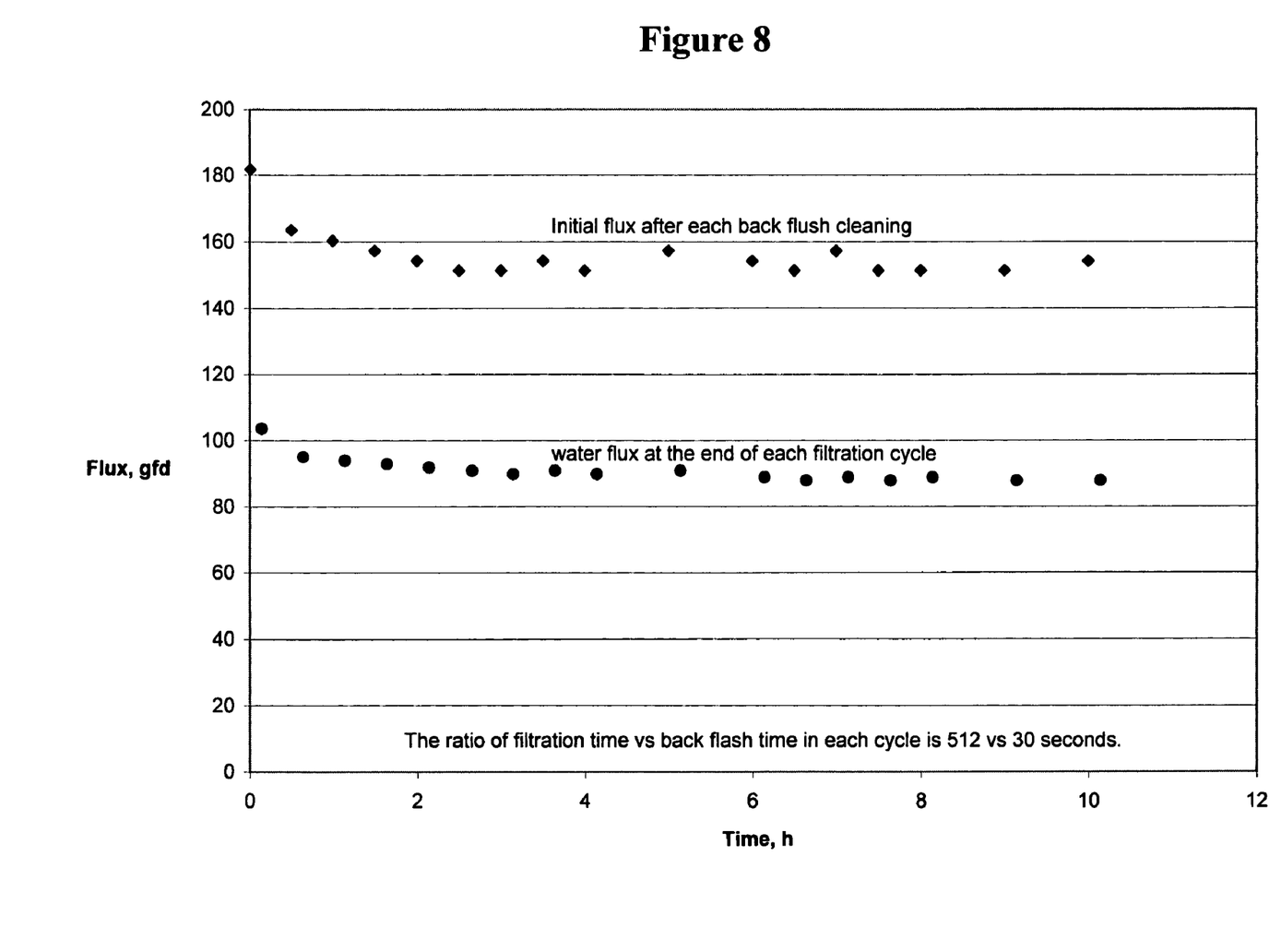
FIG. 8 is the filtration performance of a submerged membrane system shown in FIG. 6 in filtration of Canobie Lake water to produce potable water in the present invention.

The membrane system shown in FIG. 6 is used to filter lake water obtained from Canobie Lake, N.H. The braid reinforced hollow fiber composite membranes used in this system were made according to the method described in U.S. patent application Ser. Nos. 10/620,715, and 10/604,664. The operation time ratio of filtration pump, 13, to back flush pump, 24, are set at 512 seconds to 30 seconds. In filtration mode, transmembrane pressure is set at 8 inch Hg vacuum. In back flush mode, the transmembrane pressure is 6 psi, 2.5 gal of water is used for each back flush. When filtration pump, 13, is on, back flush pump, 24, is off. Similarly, when filtration pump, 13, is off, back flush pump, 24, is on, the time ratio is 512/30. The filtration result obtained is shown in FIG. 8, permeate water flux is plotted as a function of filtration time. Water flux is measured at beginning and end of each filtration/back flush cycle. As can be seen that both flux decrease rapidly at the beginning, and stabilize after about 2 hours filtration time. The initial flux after each cleaning remains as high as 150 gfd after 10 hours testing, the flux at end of each filtration/back flush cycle stabilize at about 90 gfd level. The filtered water is as clean as purified bottle water purchased from local supermarket. The inventor drunk a glass of filtered Canobie Lake water, no taste is detected, the inventor felt very well after drinking a glass of filtered Canobie Lake water.

Figure 9:
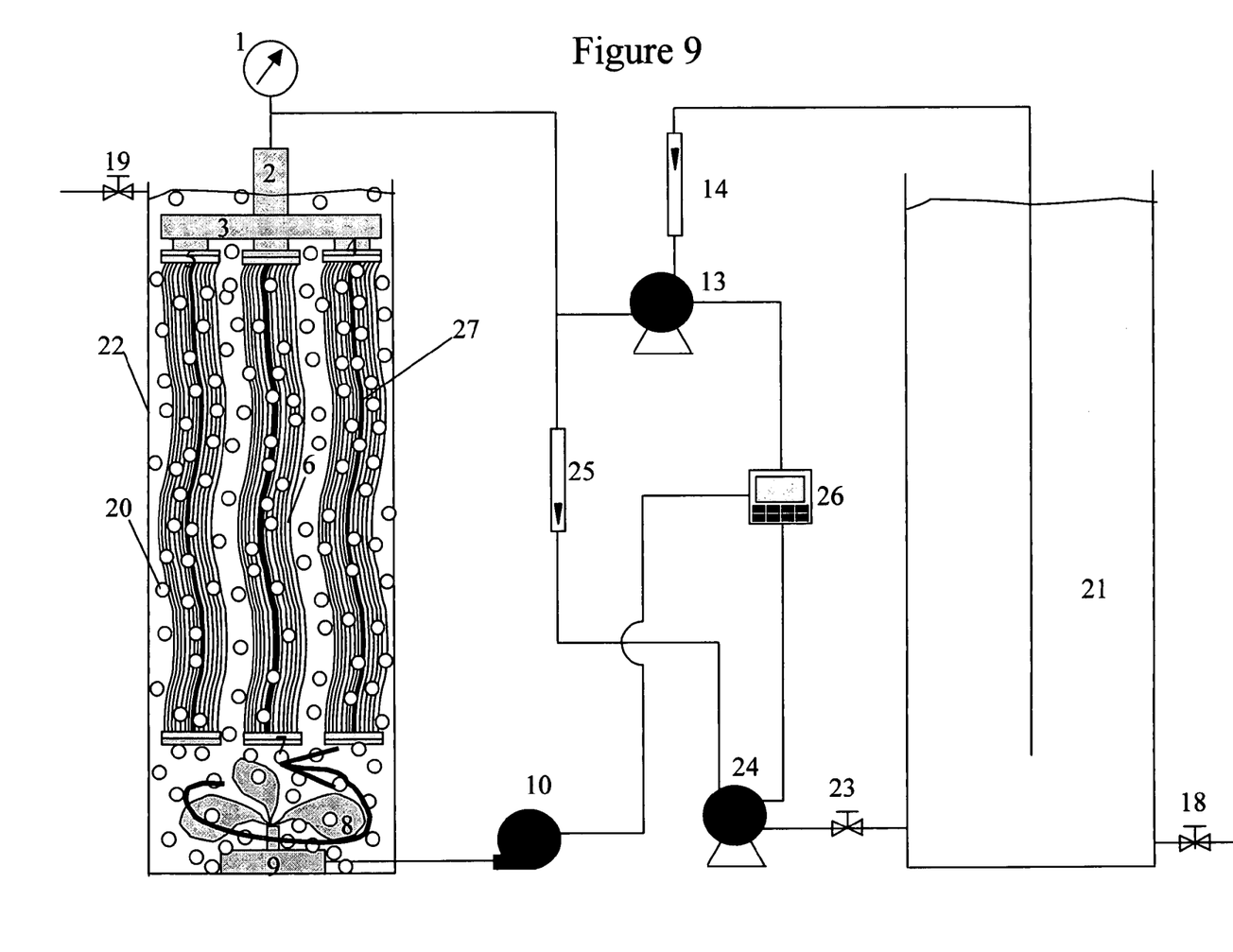
FIG. 9 is the submerged membrane system having a sophisticated computerized control of the present invention.

A submerged membrane system has sophisticated computerized control and display, 26, is shown in FIG. 9. In this system, the membrane module has a flexible non permeable tube, 27, connecting top and bottom headers together, so vacuum suction is applied from both top and bottom of the membrane.

Figure 10:
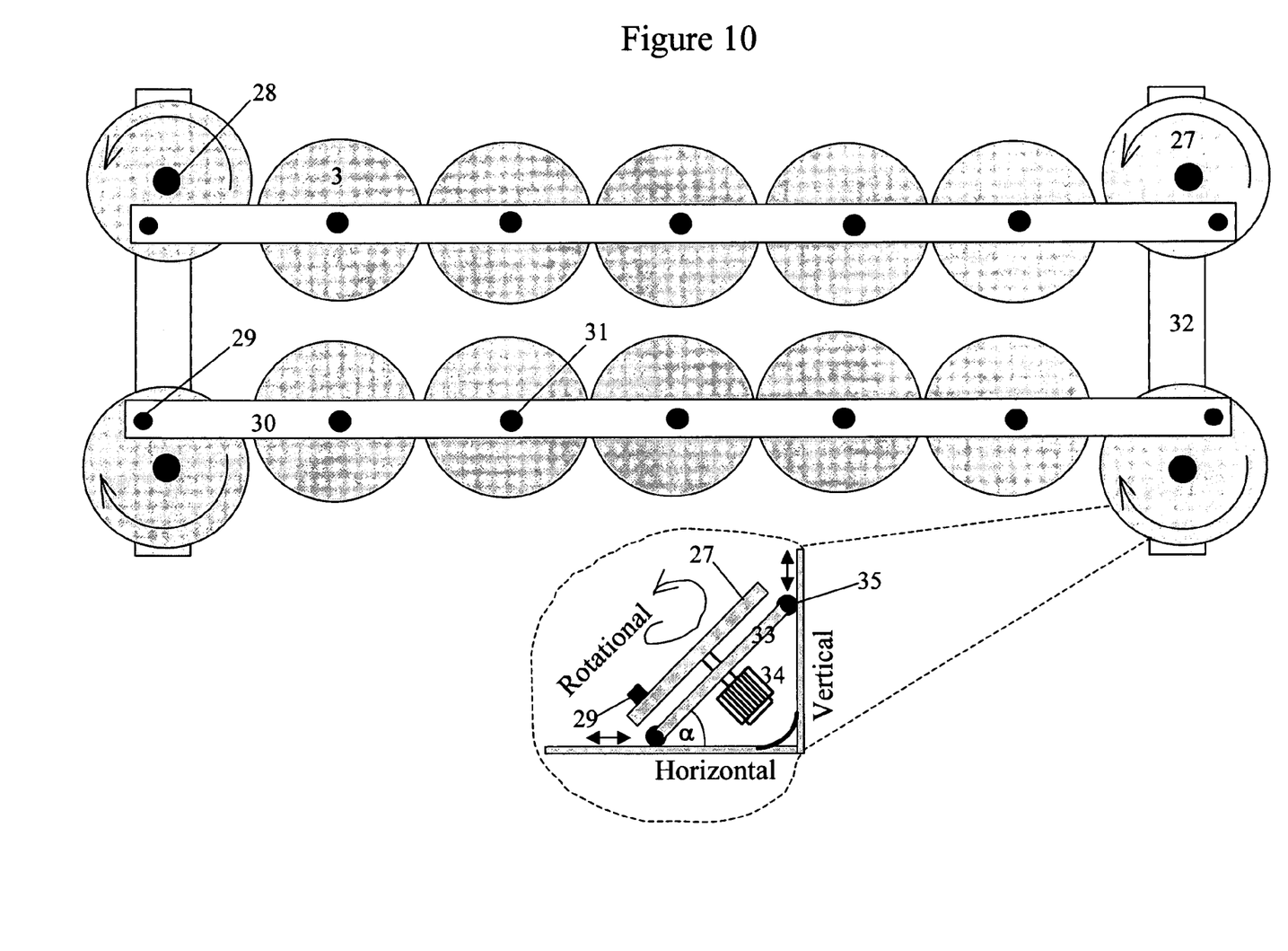
FIG. 10 is a larger submerged membrane system in the present invention having a motor installed at the end of each array to generate three-dimensional movement of membrane modules to keep membrane from fouling.

The membrane system in tank, 22, is a complete system, which can also be considered as a base unit of a super large membrane system shown in FIG. 10. In this large system, there are multiple base units connected together by a beam, 30, which is attached to a motor, 34, supported by a plate, 33, having two sliding wheels, 35. The motor can slide up and down along the triangle edges shown in FIG. 10. The end motor not only generates rotational movement but also horizontal and vertical movement to keep membrane from fouling. Such a system can operate with or without aeration, it is especially suitable for membrane bioreactor for municipal and industrial waste water treatment.

Several types of membrane module (cartridge) can be used for the membrane systems described above. The braid reinforced hollow fiber membranes described in U.S. patent application Ser. Nos. 10/620,715, and 10/604,664 can be used to make membrane modules illustrated in FIGS. 1 to 7, 9, and 10.

Figure 11:
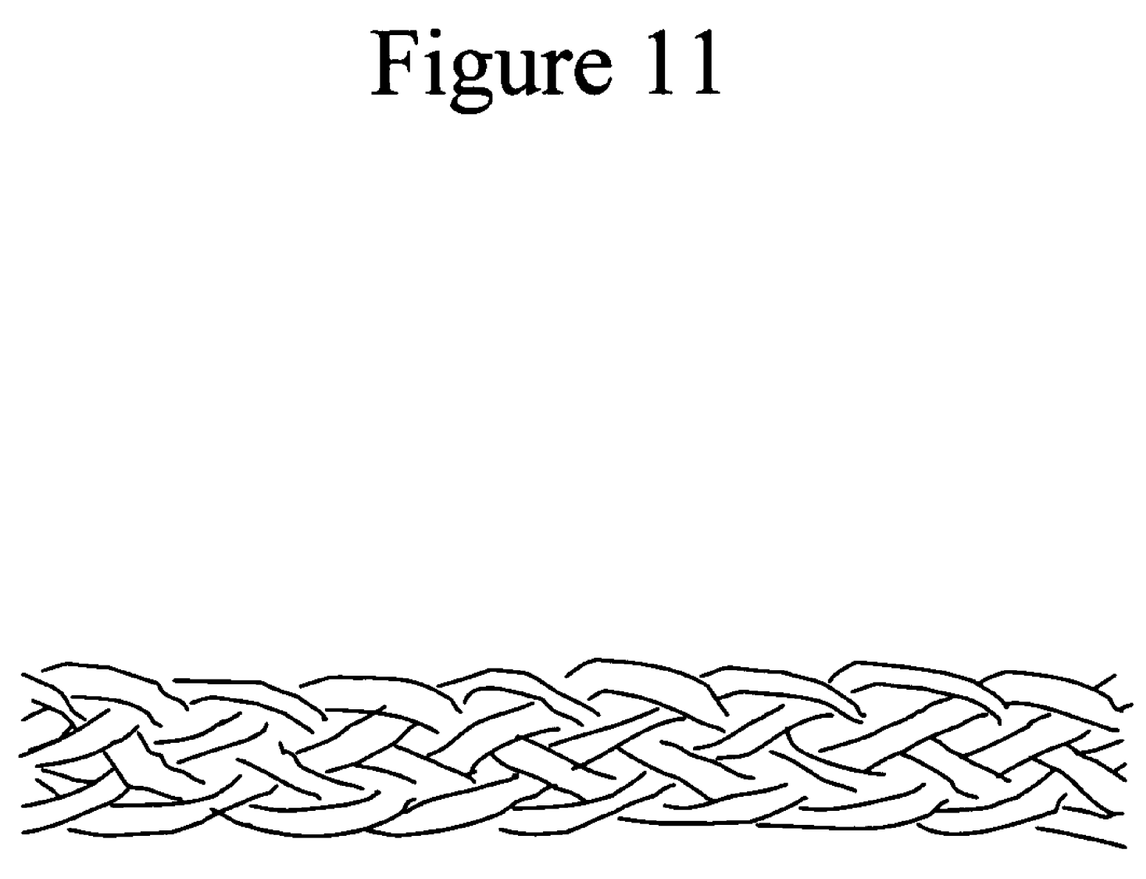
FIG. 11 is the braid of self-support hollow fiber membrane in the present invention to reinforce the membrane through braiding.

Self-support hollow fiber membranes can also be used to make a membrane module for submerged membrane system discussed above. However, self-support hollow fiber membranes often break down due to violent aeration. In the present invention, a braiding method to reinforce the self-supported hollow fiber membrane is provided as shown in FIG. 11. Multiple self-supported hollow fibers are braided together into different patterns. These self-supported hollow fibers entangle with each other to form a much stronger braid than an individual fiber, thus to strengthen each other, it will prevent the self-support membrane from failure even under violent aeration condition.

Figure 12:
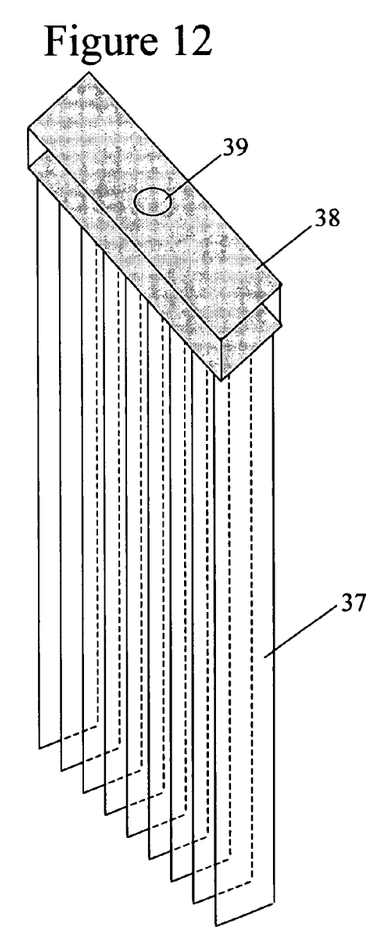
FIG. 12 is the membrane module comprising multiple strips of flat sheet membrane of the present invention.

Flat sheet membranes are used to make plate and frame membrane module for submerged membrane system in prior art, U.S. Pat. No. 5,482,625. A typical plate frame size is 1 square meter. Back pulse and back flush will cause membrane delaminated because the membrane area is so large, the force imposed on the membrane by back flush/pulse is enormous. In the present invention, a flat sheet membrane is cut into a narrow strip, a half inch to 12 inch wide, a permeate carrier strip is sandwiched between two membrane strips, the edges of the strip are sealed by ultrasonic welding, rotational melt welding, melt welding, laser welding or sealed by epoxy, silicone, polyurethane and other adhesives. A typical flat sheet membrane strip module is shown in FIG. 12. In the present invention, a wider strip or large flat sheet can also be used to make membrane module. In this case, two membranes and permeate carrier is laminated together by ultrasonic welding, there are welding lines every a half inch or one inch apart to prevent the membrane from delaminating.

Because many possible embodiments can be made without departing from the spirit and scope of the present invention, it is to be understood that all matter herein set forth is for illustration and not for limiting the scope of the present invention.

I claim:

1. A submerged membrane system comprising:
   a plurality of membrane modules releasably attached to a circular permeate top header, the top header movably attached to a motor-driven gear on a helical path in oscillating motion having simultaneous 360°-circular motion in horizontal plane and linear motion in vertical direction;
   the membrane modules submerged in a tank of water;
   each membrane module comprising a plurality of hollow fiber or flat sheet membranes; and
   an aerator which generates air bubbles and provides liquid vortex flow around the membrane modules.

2. A submerged membrane system comprising:
   a plurality of membrane module arrays, the membrane module arrays submerged in a tank of water, each of said membrane module array comprising a plurality of membrane modules releasably attached to a circular permeate top header, the circular permeate top headers being connected together by a beam, said beam movably linked to a motor mounted on a plate, said plate having wheels and movable on an angular track; the assembly of the motor, the plate and the beam movable together to provide vertical, horizontal and circular movement of the membrane modules;
   each membrane module comprising a plurality of hollow fiber or flat sheet membranes; and
   an aerator which generates air bubbles and provides liquid vortex flow around the membrane modules.

3. The system of claim 1 or 2 further comprising:
   (i) at least one pump to provide both vacuum suction to take permeate out of the membranes and back flush/pulse clean the membranes without reversing the direction of rotation,
   (ii) a system of valves to control liquid flow direction during filtration and back flush/pulse cleaning,
   (iii) a central computerized control unit to operate filtration and cleaning processes, and
   (iv) a permeate storage tank to store the permeate and use as a reservoir during back flush/pulse cleaning.

4. The system of claim 1 or 2, wherein said membrane module comprises a plurality of flat sheet membranes having a permeate carrier sandwiched between two adjacent membrane strips, edges of said membrane strips sealed by ultrasonic welding, laser welding, spin welding, melt welding, or by hot melt, epoxy, silicone, polyurethane, or other adhesives.

5. The system of claim 1 or 2, wherein said membrane module comprises a plurality of ropes of braided, self-supported hollow fiber membranes.

6. The system of claim 1 or 2, wherein said membrane module comprises braid-supported hollow fiber composite membranes.

7. The system of claim 1 or 2, wherein said membrane module comprises tubular membranes.

8. The system of claim 1 or 2, wherein said membrane module comprises cylindrical, rectangular, triangular, pentagonal, or hexagonal geometry.

9. The system of claim 1 or 2, wherein said membrane module further comprises bottom headers.

10. The system of claim 1 or 2, wherein said membrane module comprises membranes having free bottom ends, said bottom ends freely movable to reduce or prevent membrane fouling.

11. The system of claim 1 or 2, wherein said aerator comprises a propeller and a sprinkler having nozzles arranged circularly under said propeller to generate whirlpool flow around the membranes and disperse air bubbles to provide efficient and uniform aeration to keep the membranes clean.

12. The system of claim 1 or 2, wherein said aerator comprises an air motor to propel a propeller to generate liquid whirlpool flow around the membranes, exhausted air from said air motor is released through a series of air nozzles underneath the membranes to provide effective, uniform, aeration to further keep the membrane from fouling.

13. A method of utilizing the system of claim 1 or 2 comprising:
   (i) filtering surface or ground water containing suspended particles, virus and/or bacteria to give clean potable water, or
   (ii) filtering municipal sewage wastewater to give clean dischargeable and reusable water, or
   (iii) filtering industrial wastewater to give clean dischargeable and reusable water, or
   (iv) membrane bioreactor for water purification, or
   (v) membrane bioreactor for biotech, pharmaceutical and other industries.

* * * * *